US011080564B2

(12) United States Patent
Rajamohan et al.

(10) Patent No.: US 11,080,564 B2
(45) Date of Patent: Aug. 3, 2021

(54) CONTENT CLASSIFICATION TOOL WITH RE-CLASSIFICATION TECHNIQUES

(71) Applicant: Microsoft Technology Licensing, LLC, Redmond, WA (US)

(72) Inventors: Tejas Rajamohan, Bangalore (IN); Sachin Kakkar, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 16/145,289

(22) Filed: Sep. 28, 2018

(65) Prior Publication Data

US 2020/0104628 A1   Apr. 2, 2020

(51) Int. Cl.
*G06F 16/901* (2019.01)
*G06K 9/62* (2006.01)
*G06F 16/17* (2019.01)
*G06F 16/9535* (2019.01)

(52) U.S. Cl.
CPC ......... *G06K 9/628* (2013.01); *G06F 16/1734* (2019.01); *G06F 16/901* (2019.01); *G06F 16/9535* (2019.01)

(58) Field of Classification Search
CPC .. G06F 16/353; G06F 16/164; G06F 16/7837; G06F 16/958; G06F 16/215; G06F 16/683
See application file for complete search history.

(56) References Cited

U.S. PATENT DOCUMENTS

| 7,100,195 B1 * | 8/2006 | Underwood | G06F 9/451 726/2 |
| 7,680,937 B2 * | 3/2010 | Miller | G06F 21/645 709/226 |
| 8,109,362 B2 * | 2/2012 | Agrawal | F23M 20/005 181/256 |

(Continued)

FOREIGN PATENT DOCUMENTS

WO   2023533 A1 * 11/2009

OTHER PUBLICATIONS

Big Data Analytics for Cyber Security; Pelin Angin et al., Hindawi securty and communication networks; 2019.*

*Primary Examiner* — Daniel A Kuddus
(74) *Attorney, Agent, or Firm* — Hickman Becker Bingham Ledesma LLP

(57) ABSTRACT

Methods, systems, and computer programs are presented for reclassifying content in an online service. One method includes an operation for classifying a content item, to be presented on an online service, as low-quality or approved. The method further includes an operation for storing, in a content database of the online service, the content item with a content certification record (CCR). The CCR includes a result of the classifying of the content item, a content classification platform signature (CCPS), and a content signature. Further, the method includes operations for detecting a trigger for determining if the content item has to be reclassified, and for checking if the item needs to be reclassified. The checking includes comparing the CCPS in the CCR to a latest CCPS and comparing the content signature in the CCR to a current content signature of the content item. The content item is reclassified based on the checking.

22 Claims, 12 Drawing Sheets

(56) References Cited

U.S. PATENT DOCUMENTS

| | | | | |
|---|---|---|---|---|
| 8,239,458 B2* | 8/2012 | Agarwal | G06Q 10/107 | 709/206 |
| 8,255,399 B2* | 8/2012 | Sokolan | G06F 40/237 | 707/736 |
| 8,612,444 B2* | 12/2013 | Sokolan | G06F 16/353 | 707/736 |
| 8,732,473 B2* | 5/2014 | Bisso | G06F 21/577 | 713/176 |
| 9,015,301 B2* | 4/2015 | Redlich | G06F 16/2465 | 709/223 |
| 9,198,074 B2* | 11/2015 | Raleigh | H04W 48/16 | |
| 2005/0091674 A1* | 4/2005 | Knight | G06F 9/4488 | 719/332 |
| 2005/0268326 A1* | 12/2005 | Bhargavan | H04L 63/102 | 726/1 |
| 2006/0161879 A1* | 7/2006 | Lubrecht | G06Q 10/06 | 717/101 |
| 2007/0150596 A1* | 6/2007 | Miller | G06F 21/10 | 709/226 |
| 2007/0297414 A1* | 12/2007 | Gupta | H04L 47/263 | 370/395.4 |
| 2007/0297417 A1* | 12/2007 | Cohen | H04L 67/06 | 370/395.42 |
| 2008/0168135 A1* | 7/2008 | Redlich | G06F 21/6218 | 709/204 |
| 2009/0138486 A1* | 5/2009 | Hydrie | G06F 21/50 | |
| 2010/0010968 A1* | 1/2010 | Redlich | G06Q 10/00 | 707/E17.014 |
| 2011/0270834 A1* | 11/2011 | Sokolan | G06F 16/353 | 707/737 |
| 2011/0296187 A1* | 12/2011 | Bisso | H04L 9/3239 | 713/176 |
| 2015/0199410 A1* | 7/2015 | Redlich | G06F 16/93 | 726/27 |
| 2016/0323221 A1* | 11/2016 | Martell | H04L 51/32 | |
| 2016/0337133 A1* | 11/2016 | Yiu | G06N 7/005 | |

* cited by examiner

CONTENT CLASSIFICATION TOOL WITH RE-CLASSIFICATION TECHNIQUES

TECHNICAL FIELD

The subject matter disclosed herein generally relates to methods, systems, and programs for classifying content posted on an online service.

BACKGROUND

People join an on-line connection network to connect and share content with like-minded individuals to advance their careers and grow professionally. To guarantee a positive user experience, the content presented to the members is usually examined to classify the content and filter out low-quality items, such as a spam, offensive posts, non-relevant content, viruses, etc.

Usually, the classifiers get updated over time as new types of undesired content are created (e.g., fake news) or as the classifiers get improved. While the updated classifiers get applied to the newly created content, the content that is already archived in the social network does not get the benefit of the updated classifiers. This means that old content that is accessed in the network may be low-quality content and continue being presented on the on-line connection network although the updated classifiers would flag them as low-quality content.

Simply reclassifying all the content on the on-line connection network may not be a viable solution, because the amount of content accumulated over time would require a large amount of computing resources, and time, to be reclassified.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
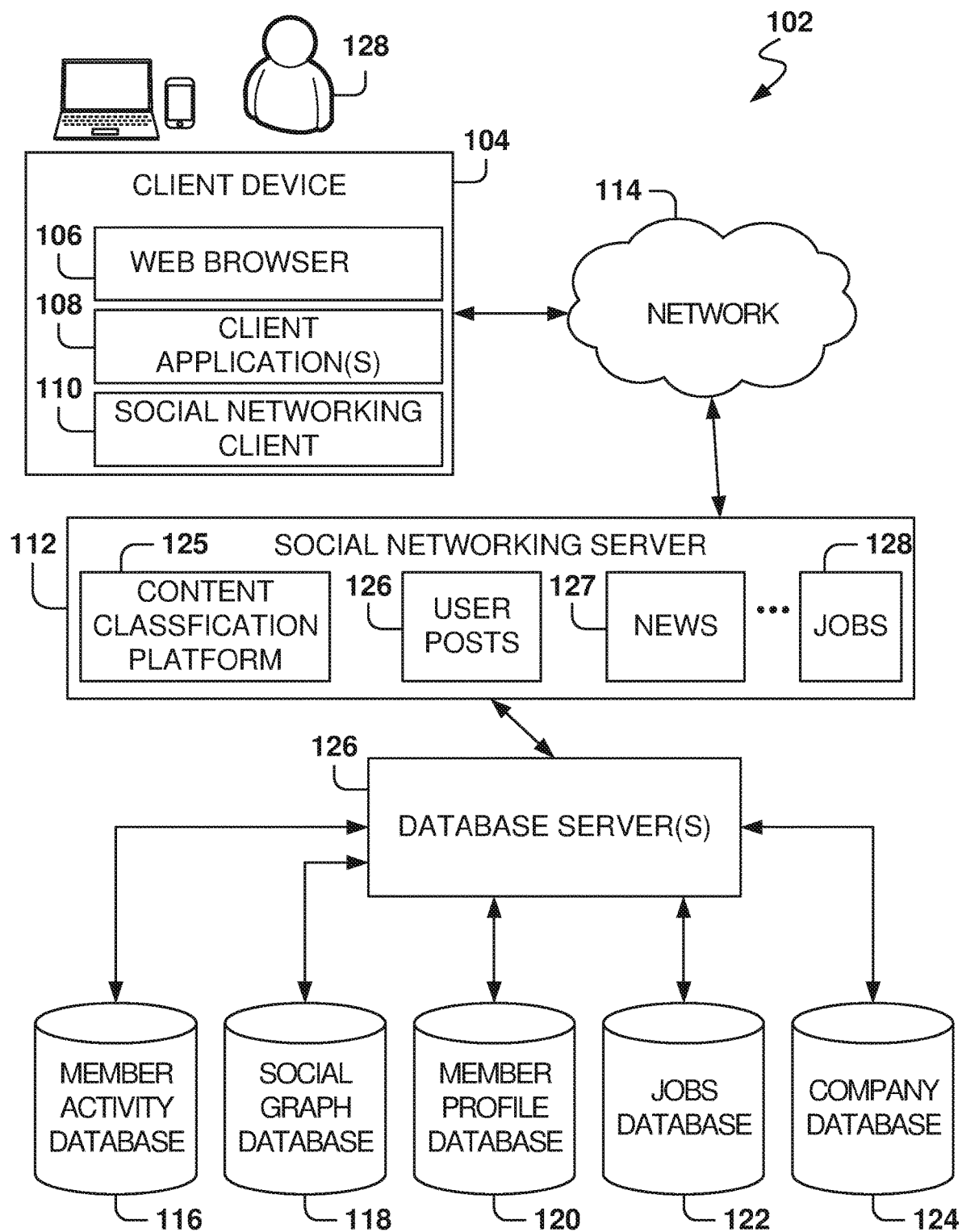
FIG. 1 is a block diagram illustrating a networked system, according to some example embodiments, including a social networking server.

Example methods, systems, and computer programs are directed to reclassifying content in an online service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To improve detection of spam and low quality content, a Content Classification Platform (CCP) evolves in terms of service policy and inclusion of new internal and third-party classification systems. As new content is classified, a Content Classification Platform Signature (CCPS), identifying which classifiers classified this content, is stored with each content item. The CCPS includes information about the classifiers used (e.g., version identifier) for analyzing the content item. If the content item is accessed at a later time, the CCPS of the item is compared to the current version of the CCPS, and if the CCPS has changed, then the item may be reclassified with the latest versions of the classifiers. Additionally, old content may not have a CCPS, and when the old content is accessed, the old content is submitted to the CCP for classifying and filtering with the current classifiers.

Furthermore, a content signature (CS) is used to uniquely represent each item of content. If the item is changed, the CS will change and trigger the reclassification of the item by the CCP. In some example embodiments, the CS is also stored with the content item in the database, together with the CCPS.

Since there is a classification of new items and reclassification of old items, other solutions might have different systems for classifying the new items and for reclassifying the old items. Having two different systems creates a synchronicity problem and being able to support and maintain two different sets of code.

Further, the complexity of the problem is increased because there are different types of content that may appear on the social network, and the different systems, referred to herein as domains, will have different performance needs and different volumes of traffic. If the classification system serves the needs of all the different domains inline, the classification system may become a bottleneck for the performance of the social network service.

The implementations presented herein provide for a distributed architecture that includes storing classification signatures and content signatures with the data in the different domains. The domains also have access to the latest classification signatures and the CCP makes the decision to determine if content needs to be reclassified or not, without having to check with the content classification platform. When reclassification is required, the content classification platform is invoked asynchronously to classify the content without impacting the performance of the different domains that are showing content to the members of the social network.

In the proposed reclassification flow, the reclassification is performed using a common nearline flow by pushing the offline content using a throttled event stream to the nearline flow. This reduces the burden to develop and maintain two copies of the same business logic, one for nearline classification and another one for offline classification. As a result, the same code is used during reclassification triggered in online, nearline, and offline modes.

The reclassification system enables the social network to proactively "clean" the social network of undesired content. Further, the social network may track how fast content is created by members, assuming that members that create content too fast may be introducing low-quality content. If reclassifying of content from a member were marked as clean, the social network will consider this when determining if the member is generating too much low-quality content. Further, the social network may take action on bad actors that post the undesired content, and the social network has a flexible classification system of content that may evolve over time to update policies as new types of threats of spam appear. For example, the reclassification system may identify some member-created content as marketing materials disguised as user posts. The social network may then filter out these systems and manage the members of the social network creating undesired content.

In one embodiment, a method is provided. The method includes classifying a content item, to be presented on a social network, as low-quality or approved. Further, the method includes storing, in a content database of the social network, the content item with a content certification record (CCR). The CCR includes a result of the classifying of the content item, a content classification platform signature (CCPS), and a content signature. Further, the method includes operations for detecting a trigger for determining if the content item has to be reclassified, and for checking if the item needs to be reclassified. The checking includes comparing the CCPS in the CCR to a latest CCPS and comparing the content signature in the CCR to a current content signature of the content item. The content item is reclassified based on the checking.

In another embodiment, a system includes a plurality of domains, each domain generating content for presentation in a social network, and a content classification platform (CCP) for classifying the content generated by the plurality of domains. The CCP comprises a content classification platform signature (CCPS), and generates a result for classifying a content item from a first domain of the plurality of domains. The first domain stores, in a database of the first domain, the content item with a content certification record (CCR), the CCR including the result for classifying the content item, the CCPS, and a content signature. Further, the first domain is configured for detecting a trigger for determining if the content item has to be reclassified, and the first domain checks if the item needs to be reclassified, the check including comparing the CCPS in the CCR to a latest CCPS and comparing the content signature in the CCR to a current content signature of the content item. Additionally, the CCP reclassifies the content item upon request from the first domain.

In yet another embodiment, a machine-readable storage medium (e.g., a non-transitory storage medium) includes instructions that, when executed by a machine, cause the machine to perform operations comprising: classifying a content item, to be presented on a social network, as low-quality or approved; storing, in a content database of the social network, the content item with a content certification record (CCR), the CCR including a result of the classifying of the content item, a content classification platform signature (CCPS), and a content signature; detecting a trigger for determining if the content item has to be reclassified; checking if the item needs to be reclassified, the checking including comparing the CCPS in the CCR to a latest CCPS and comparing the content signature in the CCR to a current content signature of the content item; and reclassifying the content item based on the checking.

FIG. 1 is a block diagram illustrating a networked system, according to some example embodiments, including a social networking server 112, illustrating an example embodiment of a high-level client-server-based network architecture 102. Embodiments are presented with reference to a social network, but the principles used herein may be used for any online service accessed by users.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means.

The social networking server 112 includes, among other modules, a content classification platform (CCP) 125, a user-posts module 126, a news module 127, a jobs module 128, etc. The modules may be implemented in hardware, software (e.g., programs), or a combination thereof. The CCP is used for classifying and filtering content, as described in more detail below.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a user 128, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a member activity database 116, a social graph database 118, a member profile database 120, a jobs database 122, and a company database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiments, the company database 124 stores information regarding companies in the member's profile. A company may also be a member; however, some companies may not be members of the social network even though some of the employees of the company may be members of the social network. The company database 124 includes company information, such as name, industry, contact information, website, address, location, geographic scope, and the like.

As users interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, posting job suggestions for the members, searching job posts, and other such interactions. In one embodiment, records of these interactions are stored in the member activity database 116, which associates interactions made by a member with his or her member profile stored in the member profile database 120. In one example embodiment, the member activity database 116 includes the posts created by the users of the social networking service for presentation on user feeds.

The jobs database 122 includes job postings offered by companies in the company database 124. Each job posting includes job-related information such as any combination of employer, job title, job description, requirements for the job, salary and benefits, geographic location, one or more job skills required, day the job was posted, relocation benefits, and the like.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124. For example, and without limitation, such interfaces and/or services may include one or more Application Programming Interfaces (APIs), one or more services provided via a Service-Oriented Architecture (SOA), one or more services provided via a Representational State Transfer (REST)-Oriented Architecture (ROA), or combinations thereof.

While the database server(s) 126 is illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

Figure 2A:
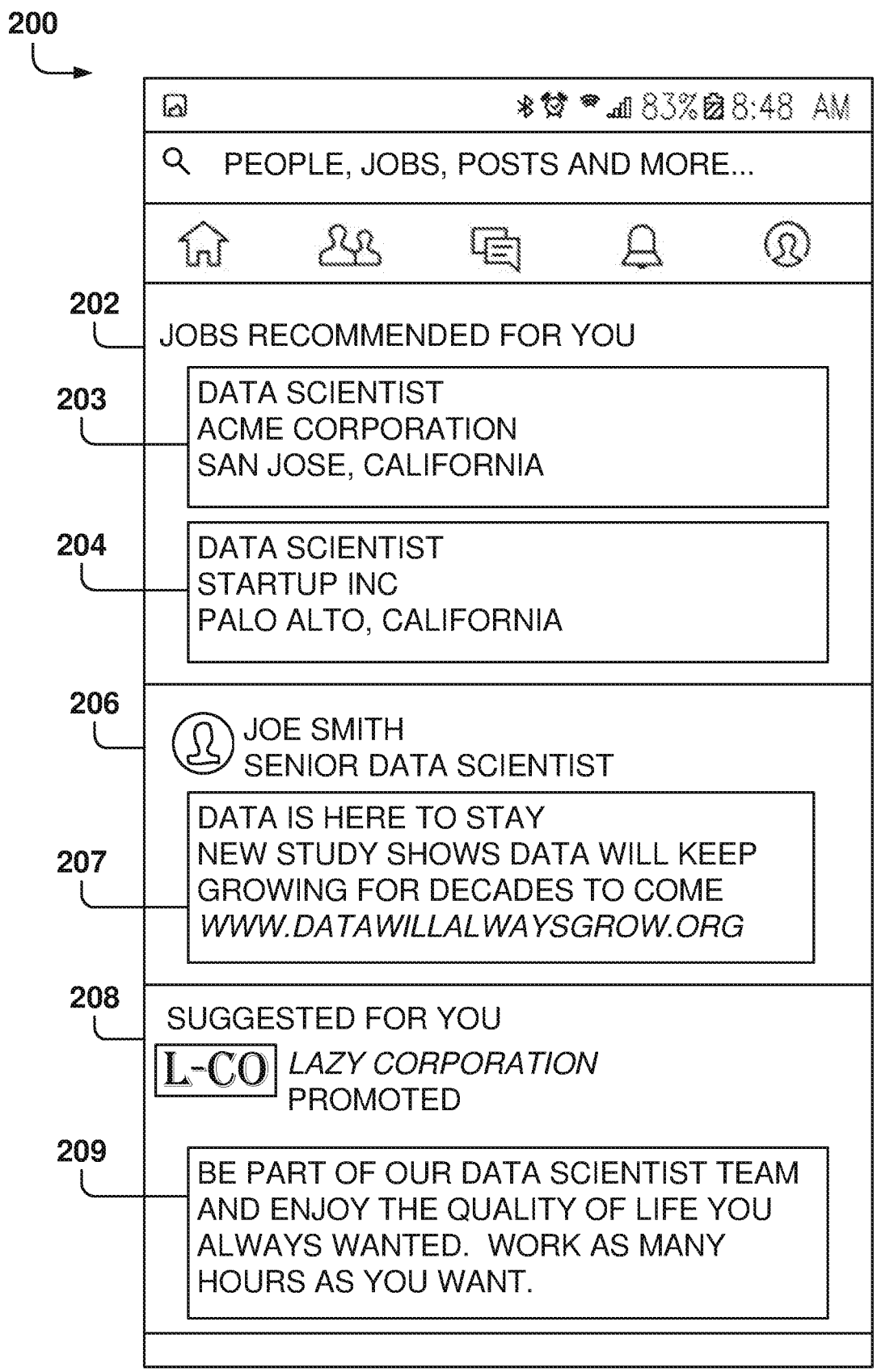
FIG. 2A is a screenshot of a user feed that includes items in different categories, according to some example embodiments.

FIG. 2A is a screenshot of a user feed that includes items in different categories, according to some example embodiments. In the example embodiment of FIG. 2A, the user feed 200 includes different categories, such as job recommendations 202, user posts 206, and sponsored items 208, and other embodiments may include additional categories.

In one example embodiment, the social network user interface provides the job recommendations 202 (e.g., job posts 203 and 204) that match the job interests of the user and that are presented with a specific job search request from the user.

The user posts 206 include items 207 posted by users of the social network (e.g., items posted by connections of the user), and may be comments made on the social network, pointers to interesting articles or webpages, etc.

The sponsored items 208 are items 209 placed by sponsors of the social network, which pay a fee for posting those items on user feeds, and may include advertisements or links to webpages that the sponsors want to promote.

Although the categories are shown as separated within the user feed 200, the items from the different categories may be intermixed, and not just be presented as a block. Thus, the user feed 200 may include a large number of items from each of the categories, and the social network decides the order in which these items are presented to the user based on the desired utilities.

Additionally, the user may receive in-network communications from other users. The communications may originate by other users who are socially connected with the user or by unconnected users. One type of communication is an inmail, which is a message sent by a company recruiter to the user. In some example embodiments, the social network provides special access to recruiters for a fee, and the special access includes access to job-related profile data of users (e.g., special searching capabilities) as well as the ability to send this special type of communications (inmails) to the users.

In some example embodiments, the content presented to users on the user feed 200 is analyzed to determine if the content is acceptable or low quality. The low-quality content may include nonprofessional content, viruses, spam, nudity, hate speech, puzzles, memes, jokes, etc., that is, any content that is not desirable in the social network based on the purpose of the social network. On the other hand, the authorized content tends to be technical, professional, and appropriate for the social network. For example, a technical article on a leading-edge technology may be authorized to be widespread and shown to many users in the social network, allowing the users to share, like, or recommend the article to other users.

In some example embodiments, once low-quality content is identified, the distribution of the low-quality content is limited. For example, the low-quality content may be banned from being shown to users or limit its distribution to direct social connections of the content generator.

In some example embodiments, the content is filtered by classifiers, where each classifier analyzes the content for a specific condition. For example, a nudity-detector classifier may analyze images to determine if the images contained nudity, which may not be appropriate in a professional-minded social network. In some cases, some content may also be classified by human judges that determine if each item is approved or low-quality.

Some example classifiers include a minor-explicit classifier, profanity, hate speech, marketing promotions, puzzles, memes, nudity, click-and-bait schemes, virus checkers, bad-URL (Uniform Resource Locator) detector, etc.

Figure 2B:
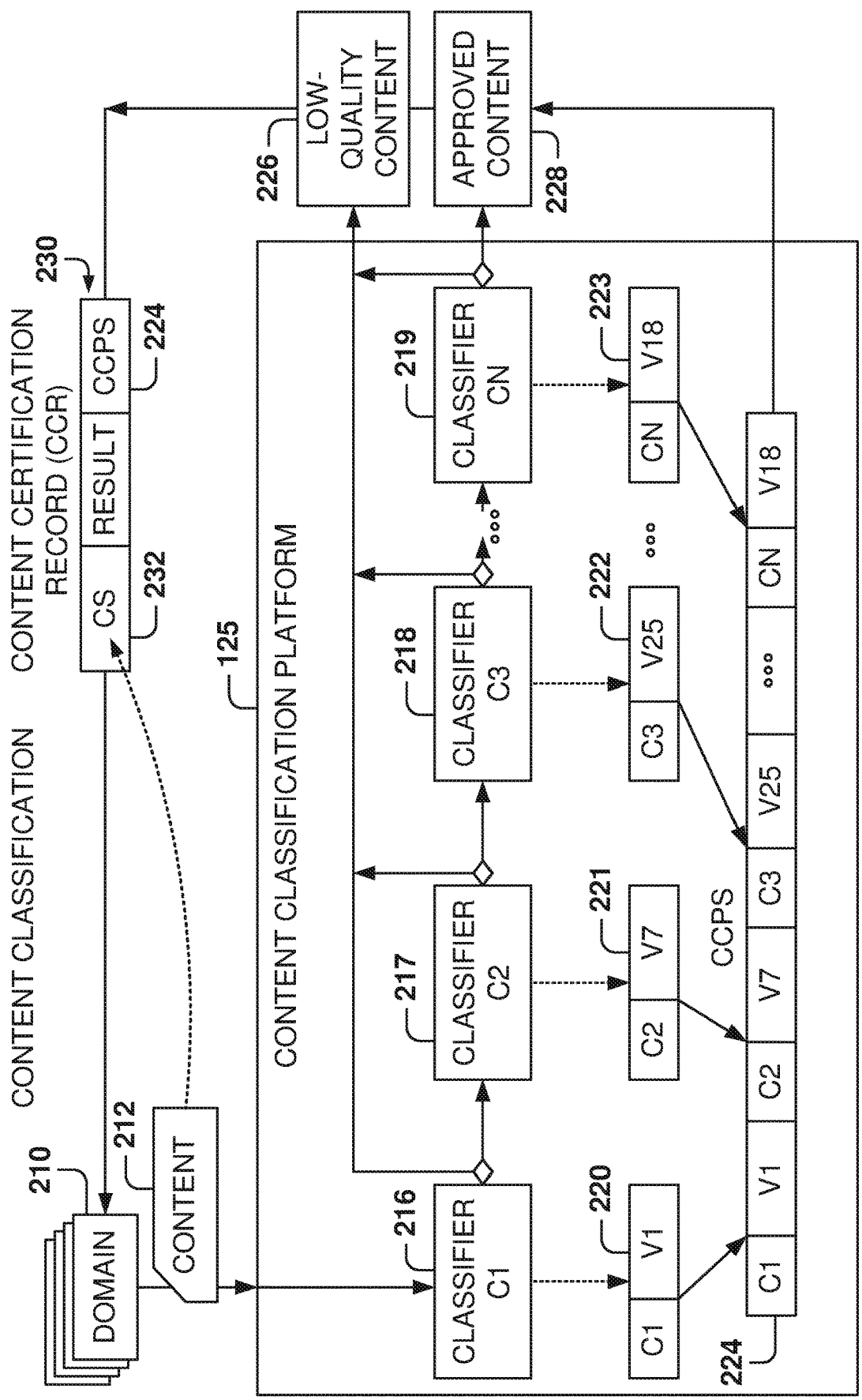
FIG. 2B illustrates the classification process, according to some example embodiments.

FIG. 2B illustrates the classification process, according to some example embodiments. A few definitions are presented before the description of the classification process.

Domain refers to an application of the social network that has User-Generated Content (UGC). For example, in a social network for professionals, the domains may include user posts, jobs, member communications, advertisements, and sponsored communications. Each domain uses a specific set of content classifiers based on the requirements of the domain, although some classifiers may be used across a variety of domains. The domain may also be referred to herein as "content source."

The Content Classification Platform (CCP), also referred to herein as the Unified Content Classification and Filtering Platform, analyzes content generated by the different domains to identify low-quality content. The classifiers of the CCP may utilize a variety of tools, such as machine-learned models, pattern matching, near-dupe detection, human-review queues, and various third-party services (e.g., virus detection) to detect and filter spam and reduce distribution of low-quality, non-professional content. Although embodiments presented herein are described with reference to machine-learning programs as classifiers, other embodiments may utilize other types of classifiers.

The Content Classification Platform Signature (CCPS) is a value that identifies the classifiers, and their respective versions, used to classify the content items. The CCPS is formed by incorporating applicable versions of all classifiers, product, and legal policies for a given domain at that point in time. In some example embodiments, the CCPS is formed by using a map with the domain identifier as a key and the values for all the classifiers identifiers and their version, applicable product labels, and policy for the corresponding domain.

The CCPS generator is a program that calculates the CCPS. The CCPS generator may re-generate the CCPS whenever one or more classifiers for the domain change.

The Unified Content Filtering Library, referred to herein as UCF-Lib or UCF library, is a thin client embedded in the domain's logic to interact with the CCP. More details are provided below with reference to FIG. 4.

The Content Certification Record (CCR) 230 is a data structure for storing classification results of the CCP, the CCPS 224, and the CS 232. The CCR 230 is stored in databases of the domain 210 alongside the domain content to enable faster access and filtering decisions at the domain. The CCR 230 is updated by the UCF library.

The Content Signature (CS) of a content item 212 is a hash value that uniquely represents the content item 212. In some example embodiments, the content item 212 may be edited in the social network and the content identifier (ID) does not change when the content item 212 is edited. Therefore, the CS is used to identify when the content item 212 has changed, which may trigger a reclassification of the content item 212. The CS acts as a unique identifier for a given snapshot of the content item 212, and the CS is stored in the CCR in some embodiments.

The content signature generator (CS generator) is a program that calculates the CS for the content item 212 based on the current value of the content item 212.

When a domain 210 sends the content item 212 to the CCP for classification, the content item 212 is analyzed by one or more classifiers (e.g., classifier C1 216, classifier C2 217, classifier C3 218, classifier CN 219). After a classifier analyzes the content item 212, the result may be that the content item 212 is approved content 228 or is low-quality content 226.

In some example embodiments, if the result is that the content item 212 is low-quality, then the item is considered low-quality. In some embodiments, the classification stops after the item is considered low-quality, but in other embodiments, the classification may continue with other classifiers for tracking and evaluating classifier performance.

If the result is that the content item 212 is approved, then the content item 212 is then analyzed by the next classifier, unless the last classifier has already reviewed the content item 212. If all the classifiers approve the content item 212, then the overall result of the classification is that the content item 212 is approved content 228.

Different domains 210 may have a different number of classifiers. In some example embodiments, the typical domain will have a number of classifiers in the range from 1 to 20.

In the example illustrated in FIG. 2B, the classification for this particular domain 210 begins with classifier C1 216. If C1 216 calculates that the content item 212 is low-quality, then the classification ends, and the content item is attributed the low-quality content 226. If C1 216 calculates that the content item 202 is approved content, then C1 216 passes the content item 212 to the next classifier C2 217, and so forth. When the last classifier CN 219 analyzes the content item, the final result will be the result estimated by classifier CN 219.

The CCPS 224 is formed by combining the classifier identifiers and their respective identifiers (e.g., version V1 for C1 216, version V7 for C2 221, etc.). In some example embodiments, additional information may be added to the CCPS 224, such as a timestamp, type of low-quality content generated by the classifier, dependencies of the classifiers, and other metadata.

In some example embodiments, the CCPS 224 may be a hash or signature of the classifier information described above that uniquely identifies the components used to classify an item at a moment in time. In other example embodiments, the information may not be hashed.

The CCR 230 is formed by adding the CCPS 224, the result of the classification of the content item 212 (low-quality content 226 or approved content 228), and the content signature CS 232. In some example embodiments, the CCR 230 may also include an identifier of the domain 210 that generated this content item 212.

Figure 3:
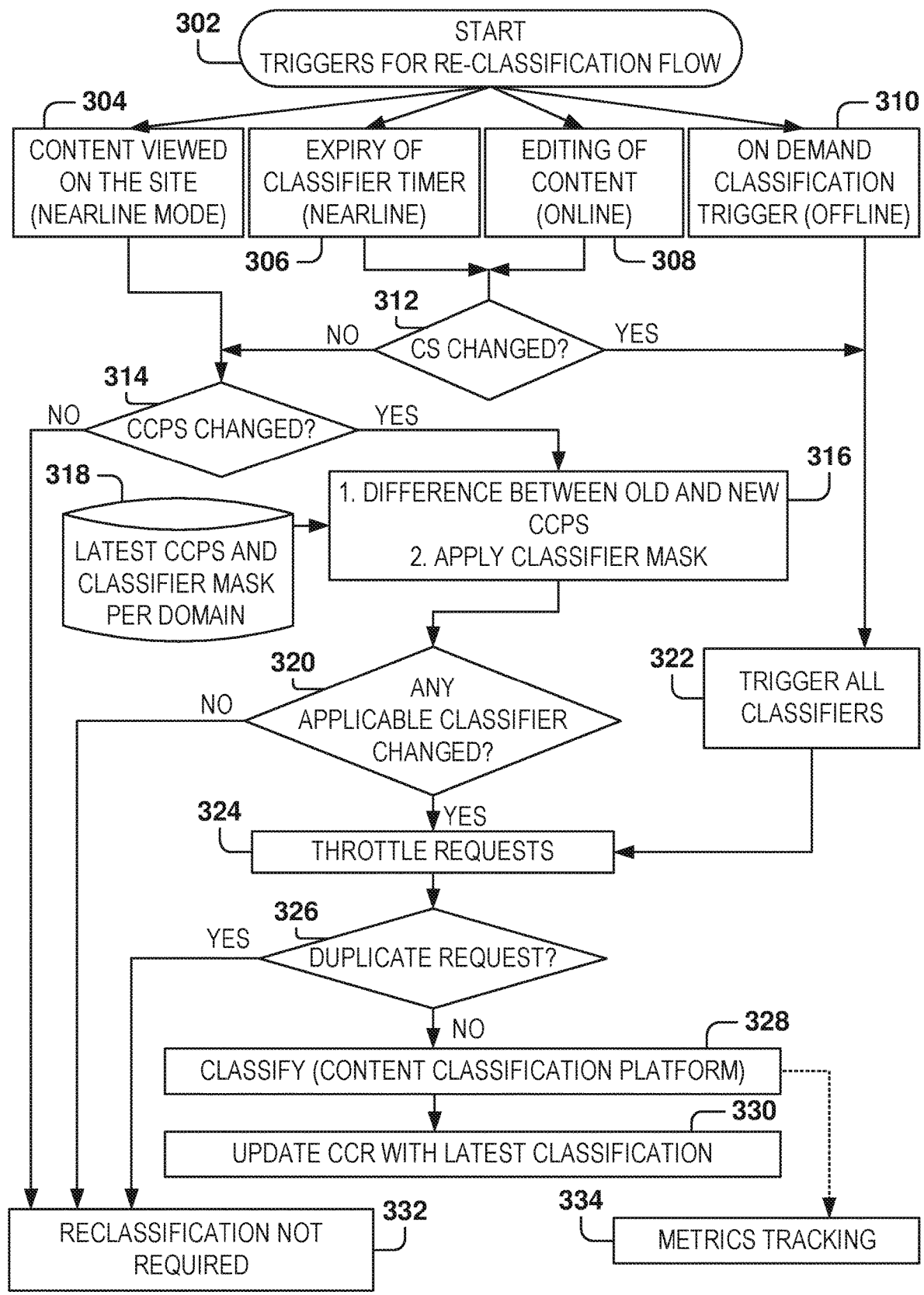
FIG. 3 illustrates the triggers that may cause reclassification of content, according to some example embodiments.

FIG. 3 illustrates the triggers that may cause reclassification of content, according to some example embodiments. Over time, the CCPS will change due to changes to the classifiers, such as when a classifier is added, the version of the classifier changes, or when the classifier is deleted. Once the CCPS changes for a domain, the new content for the domain will use the new set of classifiers, and old content (e.g., previously classified), that is accessed again on the social network, will be reclassified. As used herein, reclassification refers to the operation to classify content that has previously been classified.

This reclassification applies the newest set of classifiers on the content rendered on the social network, to quickly filter any content created in the past. This ongoing reclassification, and auto-filtering of content with new advances in the content classification platform, helps keep the social network clean for the purpose it was designed.

For example, as filtering policies change in the social network, the machine-learned classifiers are updated to reflect the new policies. For example, the fake-news problem was not present a few years ago, but eliminating fake news has become an important objective. When the new fake-news classifier is added, previous content may be reclassified for being fake news. This means that content that might have been previously acceptable, later may become low-quality (e.g., fake news).

It is noted that most of the content has a short-life cycle (e.g., about four days), but some content becomes popular and is viewed for a long time. Since most content is short-lived, reclassifying all the content in the social network every time any classifier changes, would create a lot of useless work.

It is noted, that the classification methods may be used for both new content and old content and the classification may be performed by the same systems. A solution that would have a classifier platform for new content and a classifier platform for the old content would require more resources and the possibility of lack of synchronism between the two classification platforms.

In some cases, a classifier may have an expiration date, such as classifiers used to analyze third-party external content (e.g., a URL, a virus checker). The expiration date means that the related content will be reclassified (e.g., testing that the URL is valid, updating the virus checker) from time to time, as the classifier expires.

Content may change also, which would cause the CS to change, and when the changed content is accessed, the changed content is reclassified. In summary, classifiers or existing content in the social network may change, and reclassification will be done if the classifiers or the content change. Of course, if the classifiers do not change and a previously-classified content item does not change, the a previously-classified content item will not have to be reclassified when accessed. When a content item is reclassified, the content item will be reclassified with the latest version of classifiers for the corresponding domain.

Some social networks generate a large amount of data daily, and the data stored in the social network continues to grow over time. Reclassifying old content when classifiers change would require a large amount of computational resources. Therefore, the old content is not reclassified until an event triggers their reclassification. This way, the content of the social network is continuously reclassified as needed, without having to continuously reclassify all the content every time a classifier changes.

In some example embodiments, there are four different methods that may cause a content item to be reclassified 302: nearline mode 304, nearline 306, online 308, and offline 310, which are described below.

The nearline method 304 is triggered whenever a particular content item is viewed by a member and the CCPS has changed since the content was last classified.

The nearline method 306 is triggered when a classifier expires, which is also referred to as periodic classification flow. When third-party external content (e.g., URLs shared on site), that is subject to change without prior notice, is added, a time-to-live (TTL) counter is attached. Once the counter expires, the re-classification is auto-triggered.

The online method 308 is triggered when content is created or edited by an author. In general, it is more common to have previously-authorized content change status to low-quality content than the other way around. Since the social network will generally not present the low-quality content, it would appear that content tagged as low quality would always stay as low-quality. However, even the low-quality content may be accessed by the author of the content or under other limited circumstances, such as being accessed by a direct connection of the author. Therefore, the low-quality content may be reclassified when the author accesses the low-quality content.

The offline method 310 is triggered when an administrator decides to reclassify certain content items, even if there has not been a change in the content classification platform. Thus, the off-line method is also referred to as the on-demand classification trigger. For example, sometimes a classification bug may be discovered, and the administrator may decide to reclassify certain content items.

After the nearline mode 304 has been initiated, a check 314 is performed to determine if the CCPS has changed. If the CCPS has changed, the method flows to operation 316, and if the CCPS has not changed, the method flows to operation 332, which means that reclassification is not required.

Operation 316 includes identifying the difference between the old CCPS and the new CCPS and applying a classifier mask to determine which classifiers have changed. Operation 316 includes accessing database 318 with the latest CCPS and classifier masks for each of the domains. The classifier mask identifies the classifiers within the CCPS. By applying the mask, it is possible to determine which classifiers have changed. In another example embodiments, the mask may not be utilized and all items may be reclassified if their CCPS change.

From operation 316, the method flows to operation 320 where a check is made to determine if any of the applicable classifiers, for the given content item, has changed. If there are no changes, the method flows to operation 332 (no reclassification), and if any classifier has changed the method flows to operation 324.

At operation 324, the reclassification requests are throttled in order to control the amount of resources used for reclassification. In some example embodiments, the request may not be throttled and may proceed directly to the next operation. Further yet, in some example embodiments, the classification of new items will be given higher priority than the reclassification of all items, in order to improve the speed for the items that are currently created by users of the social network.

From operation 324, the method flows to operation 326 where a check is made to determine if there are duplicate requests to reclassify the same content. If there are duplicate requests, the method flows to operation 332 (no reclassification) because there is already a pending request to reclassify the same item. Otherwise, the method flows to operation 328.

At operation 328, the content item is classified by the content classification platform. Additionally, metrics tracking may be performed at operation 334 to monitor the performance of the content classification platform. At operation 330, the CCR of the content item is updated with the latest values (e.g., CCPS, result, and CS).

After the nearline method 306 has been initiated, the method performs a check at operation 312 to determine if the CS has changed. If the CS has changed, the method flows to operation 322, and if the CS has not changed, the method flows to operation 314.

At operation 322, all the classifiers are triggered to process the on-demand request for reclassification. From operation 322, the method flows to operation 324.

After the online method 308 has been initiated, the method flows to operation 312. Further, after the offline method 310 has been initiated, the method flows to operation 322.

In some example embodiments, once an item is flagged for reclassification, the item is shown to the user before the reclassification is performed in order to avoid response delays. However, since the item has been marked for reclassification, the item will be reclassified, independently of when the member views the item. In other example embodiments, the item may be reclassified before being presented to the member.

At operation 334, several metrics are tracked and reported. The tracking includes several checkpoints in the system which is traversed by the content that is to be reclassified. Some of the metrics tracked include the number of content items for which reclassification was triggered, the number of content items which did not trigger for reclassification, and the final classification of the reclassified content items.

In some example embodiments, classifiers are trained on a specific set of content and may not be trained on the entire universe of content that was generated on the site. Due to this, certain classifiers might have lower P/R numbers on older content, but match the expected P/R numbers, specified by product policy, on the current trend of content that is being created on the site. By tracking the performance of each classifier, it is possible to eliminate, at least temporarily, a classifier that is not performing at a minimum threshold.

The precision and recall of the classifiers are tracked to ensure that the classifiers are performing appropriately. One reason is that when the classifier was built, the classifier was trained and tested on the current distribution of the content at the time. If one classifier starts classifying very old content, the classifier might misbehave because the classifier was not trained with the very old content.

Figure 4:
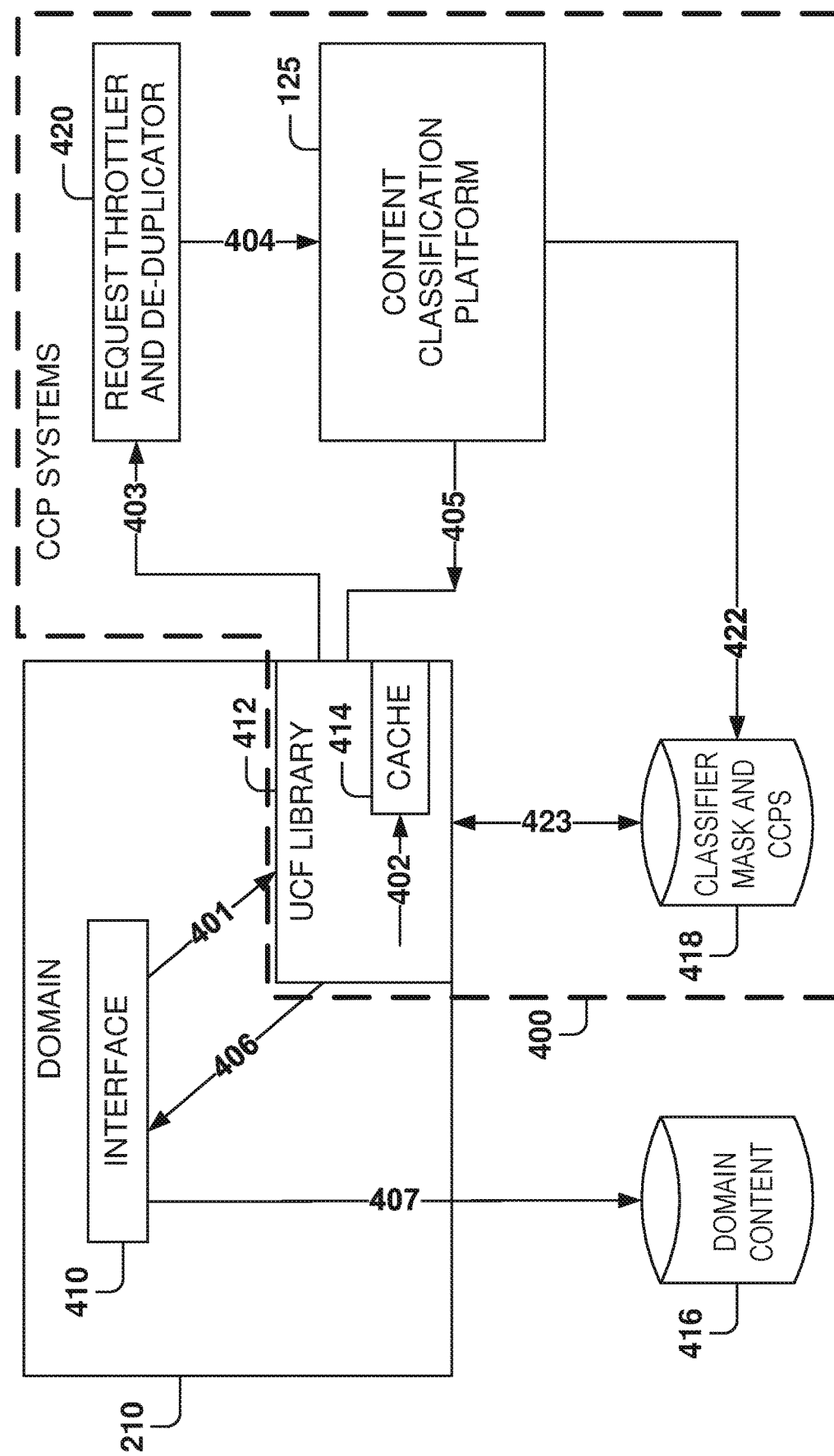
FIG. 4 is a system block diagram illustrating the interactions between the domain and the content classification platform, according to some example embodiments.

FIG. 4 is a system block diagram illustrating the interactions between the domain 210 and the CCP systems 400, according to some example embodiments. The domain 210 includes an interface for interfacing with the CCP systems and a domain-content database 416 for storing domain data.

The CCP systems 400 includes a UCF library 412 that is provided to the domain 210, a cache 414, the CCP 125, a request throttler and de-duplicator 420, and a classifier mask and CCPS database 418. The cache 414 is for storing the latest CCPS, and recent transactions with associated data, such as CS, CCPS, and CCR.

The interface 410 is used by the domain to interact with the CCP via the UCF Library 412. Further, the request throttler and de-duplicator 420 is used to manage the reclassification requests in order to control the flow and avoid duplicate reclassification operations.

The number of content items created on a social network may be in the order of billions, and it would be inefficient to store content signatures and CCPS for all these items in the content classification systems 400 because the CCP would become a bottleneck for the social network. Instead, the CCPS and the CS are stored in the domain content database 416 together with the content so the domain 210 is better able to manage the data and the signatures associated with the data. This strategy provides a distributed storage solution, reduces cost to serve the content signatures, and removes the need for an ever-growing complex database maintained by a centralized content classification platform. It also enables the system to handle a high number of content-related queries per second with low latency by providing client-side libraries for in-memory comparison of signatures.

As classifiers change or are added to the CCP 405, the CCPS changes over time. The current CCPS is sent periodically from the CCP 125 to the domain 210, which is referred to as a heartbeat CCPS transmittal. When an item is rendered on site, the CCPS of the item is compared to the current CCPS, and if they are different a reclassification will be triggered for this content item in an asynchronous (nearline) manner. Also, if the CS has changed, the content item will be reclassified.

With the heartbeat stored in the cache 414, the domain 210 compares the item's CCPS, which was stored next to the item, with the latest CCPS to make a quick determination if reclassification is needed, instead of having to the send item back to the CCP 405 to determine if the reclassification is needed.

By storing the CS and the CCPS of the content items in the domain content database 416, a distributed storage solution is provided that removes the need for an ever-growing complex database maintained by a centralized content classification platform. Instead, each domain is able to handle the growth of content as each domain is designed to handle the desired capacity needed to operate the social network.

Each domain has its own requirements for processing content, e.g., queries per second (QPS), and the different domains may have different QPS goals. If CCP were to handle the checking of the reclassification of items, then the CCP would have to be able to handle the peak QPS from among all the domains. This would result in wasted resources.

A description of the content classification flow begins with operation 401, where the content item that is created or edited is sent to the UCF Library 412 to check if reclassification is needed for the content item. Operation 412 is an in-process call and is used by the online and nearline flows.

At operation 402, the UCF Library 412 fetches the latest CCPS from the cache 414 and compares the latest CCPS with the item's CCPS. If required, the UCF library 412 generates the latest CS for the item.

If the latest CCPS or CS differ from the CCPS or CS of the item, then a reclassification request is triggered and a request is sent 403 to the CCP via the request throttler and de-duplicator 420. Operation 403 is a nearline call.

The request for reclassification, if not a duplicate, is forwarded 404 from the request throttler and de-duplicator 420 to the CCP 125. Operation 404 is an online core call.

The CCP performs the reclassification, accessing 422 the classifier masks and CCPS database 418. Further, the CCP 125 sends 405 (a nearline call) the result of the reclassification to the UCF library 412. In response, the UCF library 412 forwards 406 the reclassification result to the domain interface 410.

The interface 410 stores 407 the reclassification result returned by the UCF library 412 in the domain content database 416.

Further, the UCF library 412 periodically fetches 423 the latest CCPS and classifier mask for the domain 210 to get the latest CCPS (heartbeat operation).

Figure 5:
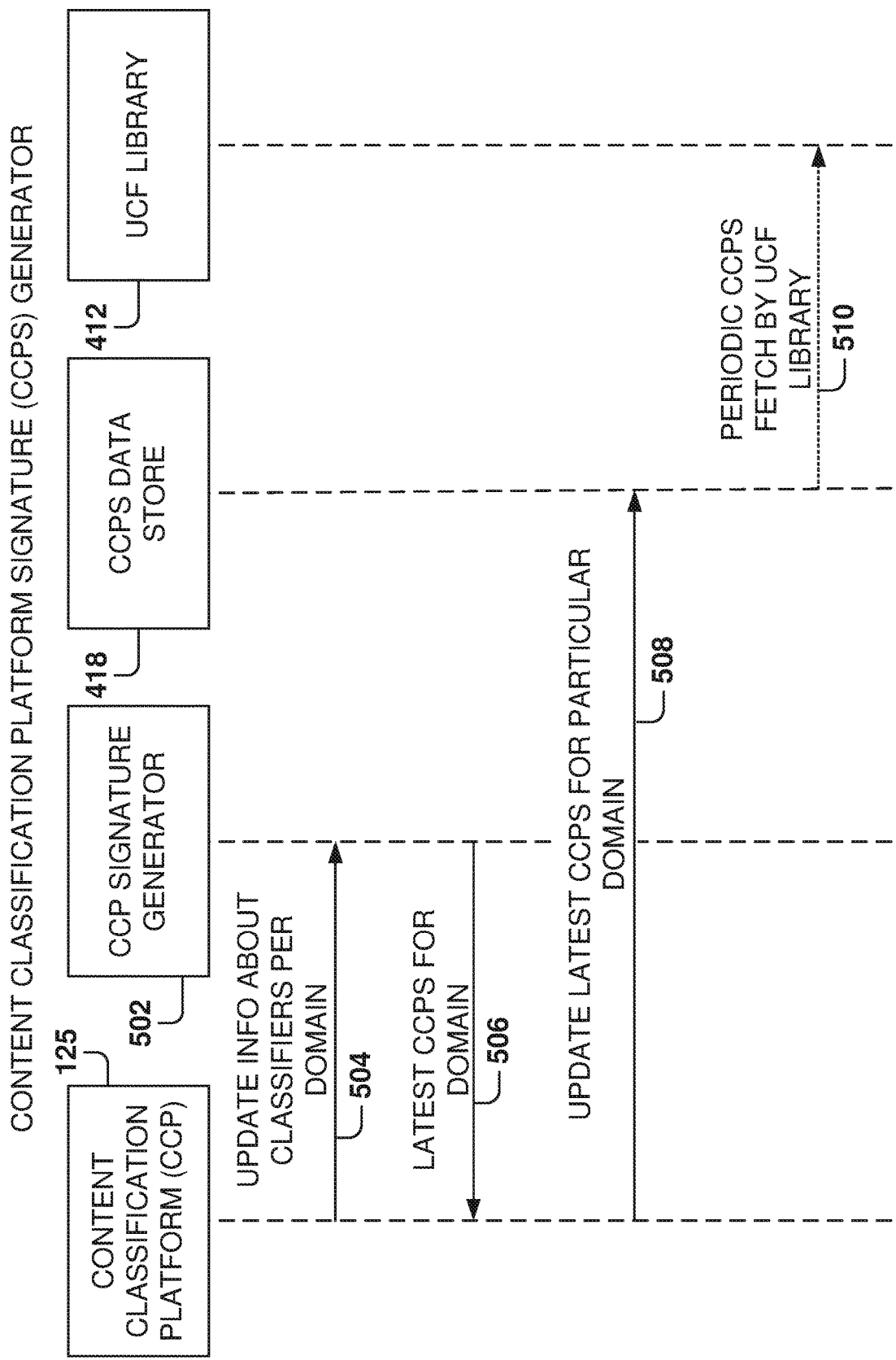
FIG. 5 illustrates the operations of the content classification platform signature generator, according to some example embodiments.

FIG. 5 illustrates the operations of the content classification platform signature generator, according to some example embodiments. At operation 504, the CCP 125 transmits updated information, about the classifiers per domain, to the CCP signature generator 502. The CCP signature generator transmits 506 the latest CCPS for the domain that covers the current classifiers and their versions IDs.

At operation 508, the CCP 125 sends 508 and update to the CCPS data store 418 with the latest CCPS for the particular domain. Operations 504, 506, and 508 are online calls.

Asynchronously, the UCF library 412 will do a periodic fetch 510 of the latest CCPS from the CCPS data store 418 (e.g., heartbeat operation to keep the latest CCPS updated in the domain).

Figure 6:
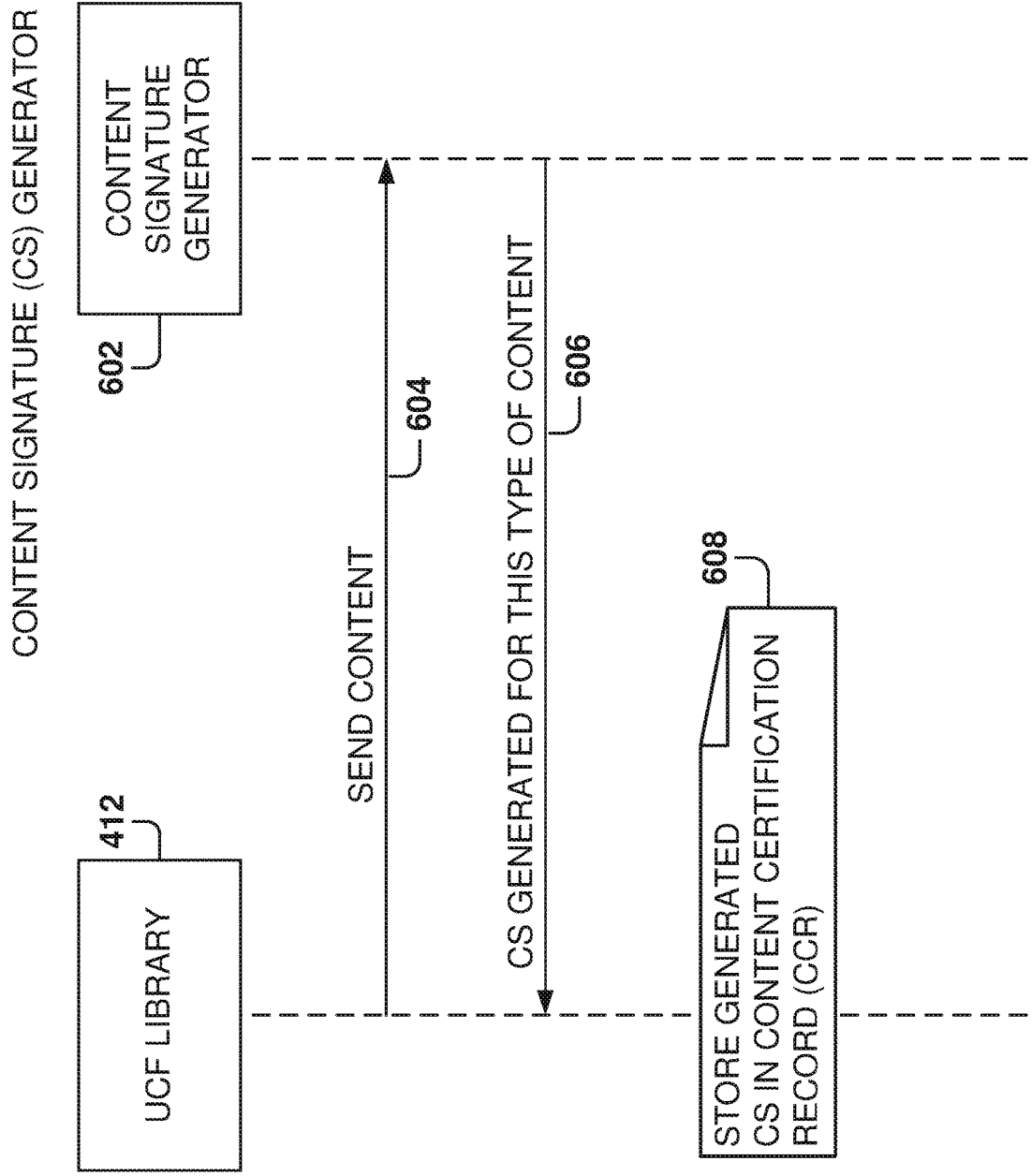
FIG. 6 illustrates the operations of the content signature generator, according to some example embodiments.

FIG. 6 illustrates the operations of the content signature generator 602, according to some example embodiments. As discussed above, a CS is created for a content item based on the content of the item (e.g., a hash of the information in the item). The CS is used to quickly identify if a particular item has been changed. If the CS in the CCR of the content item is different from the current CS of the content item, it means that the item has changed (e.g., it has been edited by the author). Since the item has changed, the item will be reclassified to determine if the item is low-quality or if the item is approved for presentation in the social network.

At operation 604, the UCF library 412 sends 604 a content item to the content signature generator requesting the CS for the content item. After the content signature generator 602 generates the CS for the content item based on the item's type, the CS generator 602 transmits 606 the generated CS to the UCF library 412.

At operation 608, the UCF library 412 stores the generated CS in the CCR of the content item.

Figure 7:
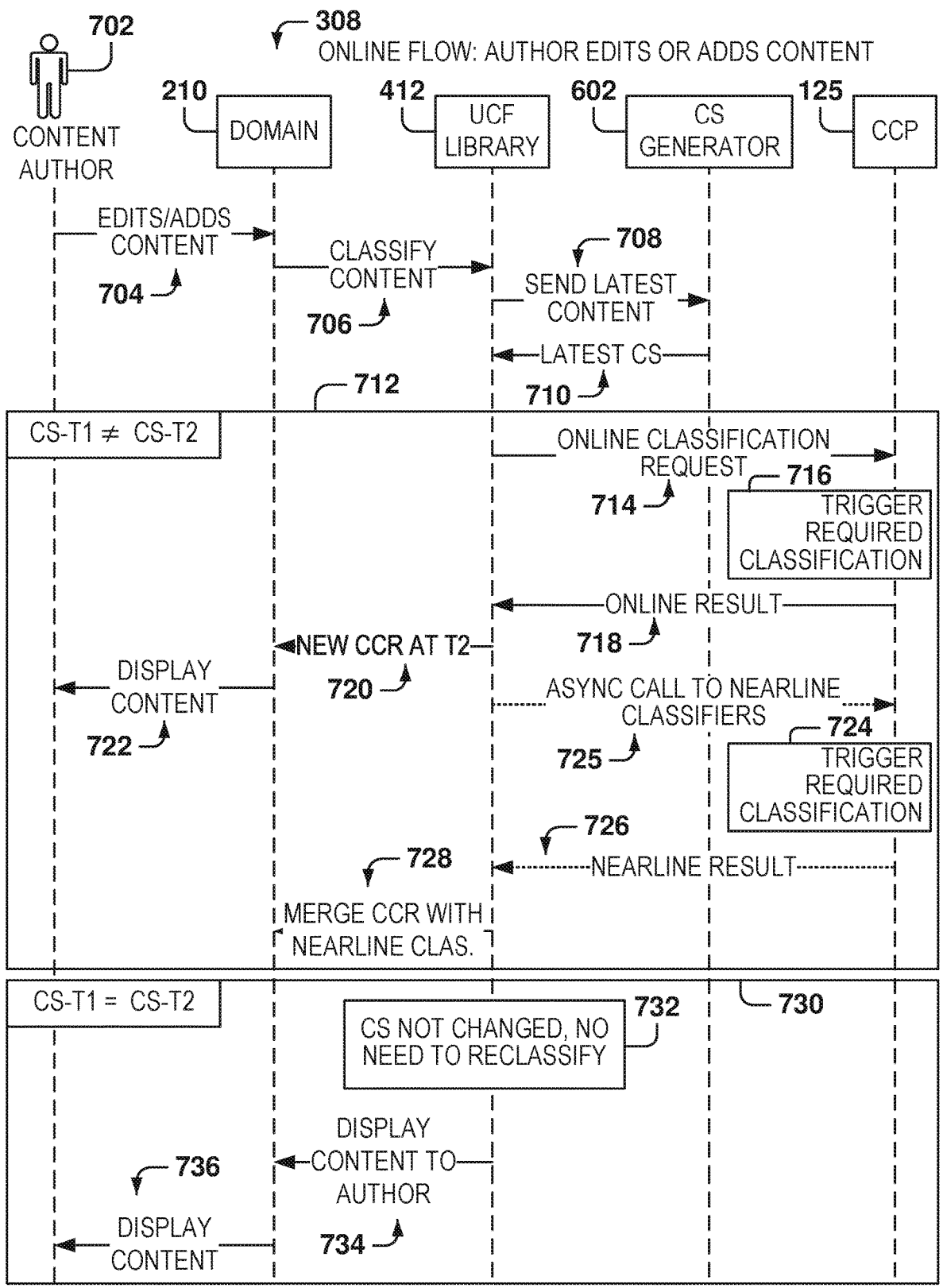
FIG. 7 illustrates the online flow for content classification when content is created or edited by the author, according to some example embodiments.

FIG. 7 illustrates the online flow 308 for content classification when content is created or edited by the author, according to some example embodiments. Whenever any content item created by members change, the online classification request is performed for that content item. In some example embodiments, the content item is not visible to anyone other than the author until the reclassification response is returned. In other example embodiments, the content may be visible, at least until the content item is reclassified.

After the content author 702 edits or adds a content item, the content item is sent 704 to the domain 210. The CS of the content item before the item was edited is referred to as the CS at time $T_1$ or $CS$-$T_1$. The domain 210 sends a classified content request 706 to the UCF library 412, as discussed above. Further, the UCF library 412 sends 708 the current version of the content item to the CS generator 602. After that CS generator 602 calculates the latest CS for the content item (referred to as CS at time $T_2$ or $CS$-$T_2$), the CS generator 602 sends 710 the $CS$-$T_2$ to the UCF library 412. Since $T_2$ corresponds to the present time, $T_1$ is earlier in time than $T_2$.

The UCF library 412 compares $CS$-$T_1$ and $CS$-$T_2$. If $CS$-$T_1$ is equal to $CS$-$T_2$ (the CS has not changed) then method 712 is performed. If $CS$-$T_1$ is not equal to $CS$-$T_2$ (the CS has changed) then method 730 is performed.

Method 712 includes operation 714, where the UCF library 412 sends 714 an online classification request to the CCP 125. The CCP 125 triggers the required classification at operation 716 (e.g., current classifiers for the domain).

The CCP 125 sends 718 the result of the online request for reclassification back to the UCF library 412. The UCF library 412 then calculates the new CCR at the present time (e.g., $T_2$) and sends 720 the new CCR to the domain 210. The domain 210 then displays 722 the content item to the content author.

Additionally, method 712 includes an asynchronous call 725 to nearline classifiers, which is sent from the UCF library 412 to the CCP 125. The CCP 125 determines, at operation 724, that reclassification is required. The CCP 125 sends 726 the nearline result of the reclassification to the UCF library 412. The UCF library 412 then merges 728 the CCR with the nearline classification. Operations 725 and 726 are asynchronous operations.

Method 730 is for when the CS has not changed, so there is no need to reclassify the content item 732. At operation 734, the UCF library sends the content to the domain 210 for display to the author. The domain 210 then displays 736 the content item to the content author.

Figure 8:
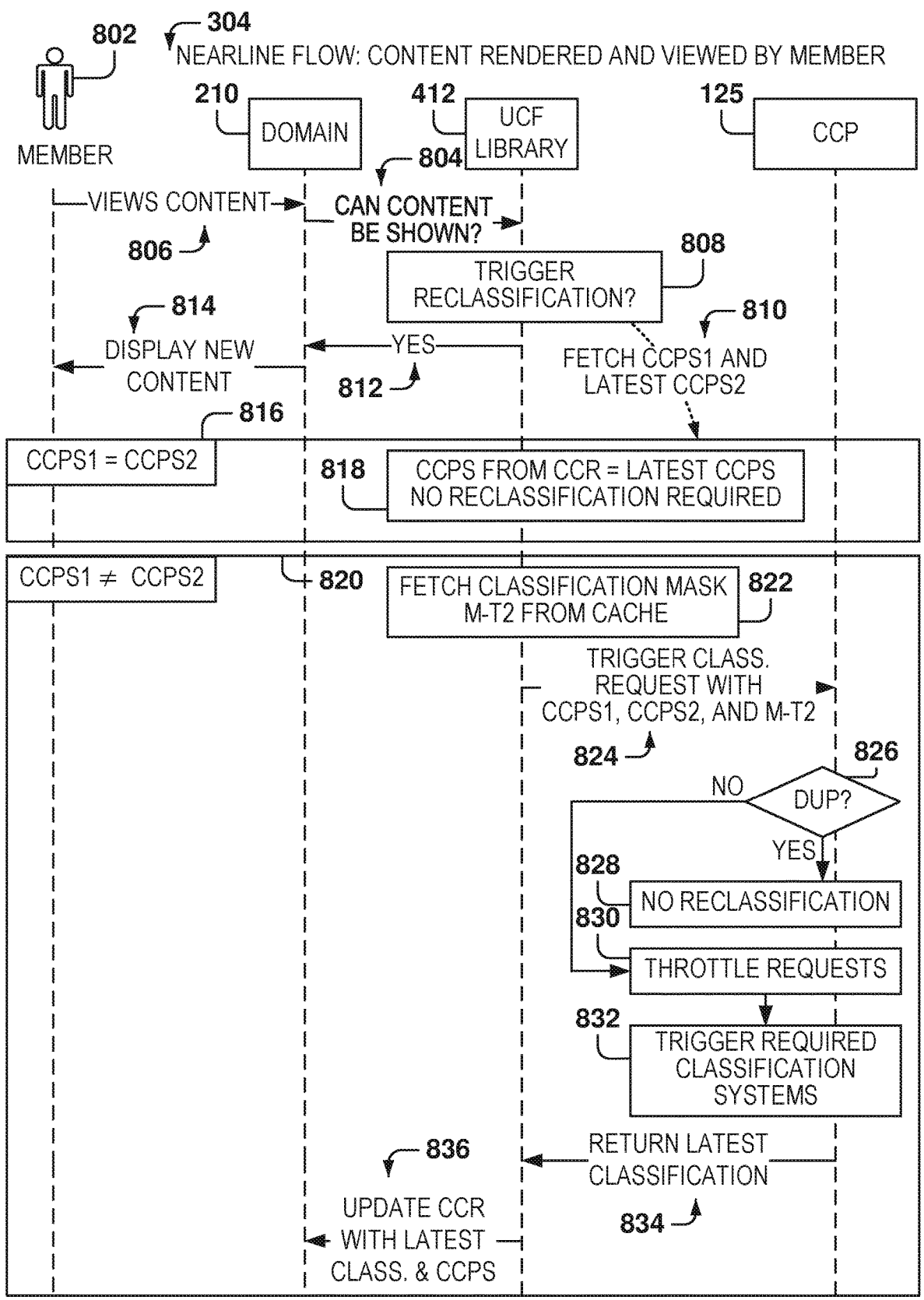
FIG. 8 illustrates the nearline flow for content classification when content is rendered and viewed by a member, according to some example embodiments.

FIG. 8 illustrates the nearline flow 304 for content classification when content is rendered and viewed by a member 802, according to some example embodiments. Whenever a particular content item is viewed by the member 802 and the CCPS has changed since the content was last classified, then nearline mode reclassification 304 for the content is triggered.

When the member 802 views 806 the content item from domain 210, the domain 210 sends a request 804 to the UCF library 412 asking if the content item may be shown to the member 802. The UCF library 412 performs a check 808 to determine if reclassification needs to be triggered. The UCF library 412 responds 812 to the domain 210 that the content item may be viewed, while, asynchronously, the UCF library 412 fetches 810 the CCPS stored in the CCR of the item, referred to has CCPS1, and the latest (e.g., current) CCPS for the domain, referred to as CCPS2. By using the asynchronous reclassification, the member 802 viewing the content item does not have to wait for the reclassification.

The UCF library 412 compares CCPS1 and CPPS2. If CCPS1 is equal to CCPS2, the CCPS has not changed and no classification is required 818. If CCPS1 is not equal to CCPS2, the CCPS has changed and method 820 for reclassification is performed. The method 820 includes operation 822 for fetching the classification mask at the current time, referred to herein as M-T2, from the cache. The UCF library 412 triggers 824 a classification request with CCPS1, CCPS2, and M-T2 and sends 824 the request to the CCP 125.

The CCP 125 performs a check at operation 826 to determine if the request for reclassification is a duplicate. If the request is a duplicate, it means that there is already reclassification request for the content item, therefore, no reclassification 828 is needed. If there is no duplicate requests, the method flows to operation 830 where the request may be throttled, as discussed above.

At operation 832, the required classification systems for the content item are triggered 832. The result of the latest classification is returned 834 to the UCF library 412. The UCF library 412 then sends a request to the domain 210 to update the CCR of the content item with the latest classification result and the current CCPS (e.g., CCPS2).

The mask M-T2 is used to determine which classifiers may need to be used for the reclassification. In other example embodiments, the mask M-T2 is not used, and all the pertinent classifiers for the content item are executed, as illustrated above with reference to FIG. 2B.

The embodiment illustrated in FIG. 8 shows asynchronous reclassification where the user does not have to wait for the reclassification by the CCP 125. In other example embodiments, the reclassification is performed before the content may be viewed by the member 802.

Figure 9:
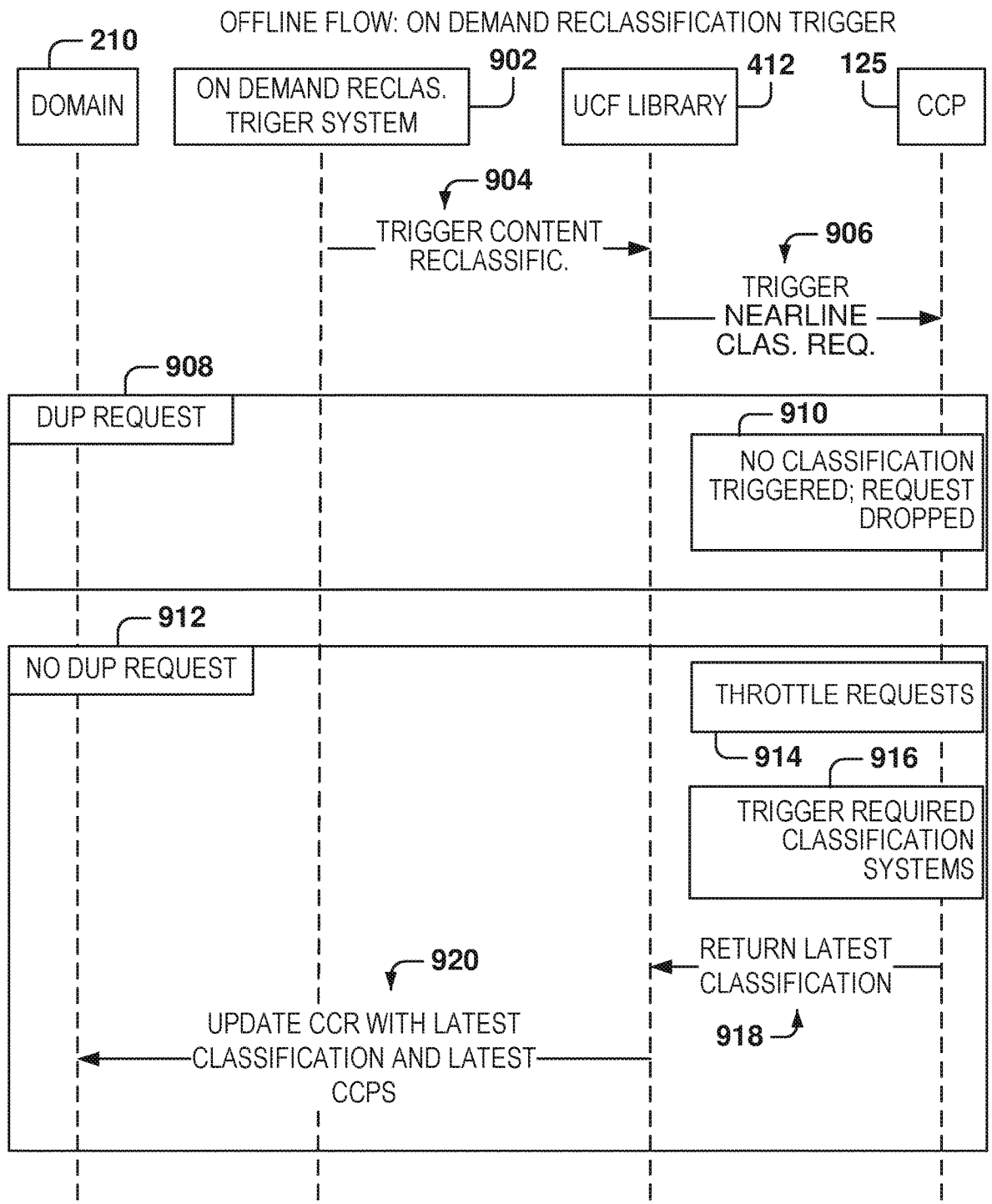
FIG. 9 illustrates the on-demand reclassification flow, according to some example embodiments.

FIG. 9 illustrates the on-demand reclassification trigger 310, according to some example embodiments. There are cases where the administrator of the social network wishes to reclassify a set of content in a particular domain, and two reclassify the content without changing the state of the content classification platform. This capability is provided by the on-demand offline re-classification flow 310.

At operation 904, the on-demand reclassification triggering system 902 sends a request 904 to the UCF library 412 requesting content reclassification. The UCF library 412 then forwards 906 the nearline classification request to the CCP 125.

The CCP 125 determines if the request for reclassification for the given item is a duplicate request. If the request is a duplicate 908, no reclassification is triggered 910 and the request is dropped.

If the request for reclassification of the content item is not a duplicate 912, the CCP 125 queues the request and throttles 914 the request based on the load of the system. At operation 916, the CCP 125 triggers the required classification systems, and sends 918 the latest classification (e.g., CCR) to the UCF library 412. The UCF library 412, at operation 920, updates the CCR for the content item with the latest classification result in the current CCPS.

Figure 10:
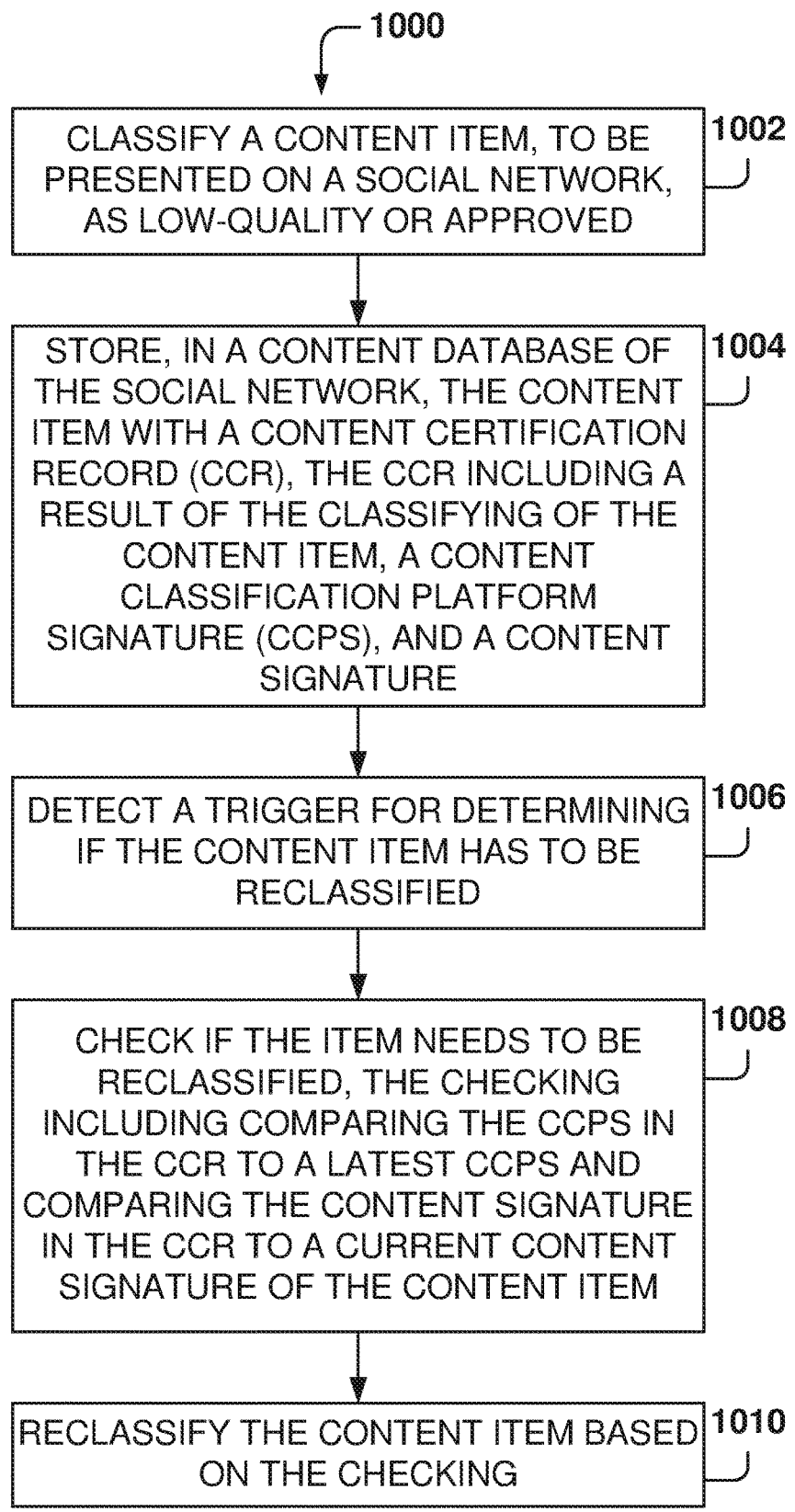
FIG. 10 is the flowchart of a method for reclassifying content in an online service, according to some example embodiments.

FIG. 10 is the flowchart of a method 1000 for reclassifying content in a social network, according to some example embodiments. While the various operations in this flowchart are presented and described sequentially, one of ordinary skill will appreciate that some or all of the operations may be executed in a different order, be combined or omitted, or be executed in parallel.

Operation 1002 is for classifying a content item, to be presented on a social network, as low-quality or approved. From operation 1002, the method 1000 flows to operation 1004.

Operation 1004 is for storing, in a content database of the social network, the content item with a content certification record (CCR). The CCR includes a result of the classifying of the content item, a content classification platform signature (CCPS), and a content signature. From operation 1004, the method 1000 flows to operation 1006.

At operation 1006, a trigger, for determining if the content item has to be reclassified, is detected. From operation 1006, the method 1000 flows to operation 1008.

Operation 1008 is for checking if the item needs to be reclassified. The checking includes comparing the CCPS in the CCR to a latest CCPS and comparing the content signature in the CCR to a current content signature of the content item. From operation 1008, the method 1000 flows to operation 1010.

At operation 1010, the content item is reclassified based on the checking.

In one example, classifying the content item further includes: analyzing the content item by one or more classifiers, each classifier determining if the content item is approved or is low-quality; determining that the content item is low quality if any classifier determines that the content item is low-quality; and determining that the content item is approved if each of the one or more classifiers determines that the content item is approved.

In one example, the CCPS includes, for each of the one or more classifiers, a classifier identifier and a classifier version.

In one example, the trigger is selected from a group consisting of the content item being viewed on the social network, an expiration of a timer of a classifier, the content item being edited, and an on-demand classification request.

In one example, the content item is classified by a content classification platform (CCP), wherein the social network includes a plurality of domains that generate content items, and the method 1000 further comprises providing a unified content filtering library (UCF library) at each domain, the UCF library interfacing with the CCP for classifying content items.

In one example, the CCR is stored within the domain associated with the content item.

In one example, the method 1000 further comprises periodically sending the latest CCPS from the CCP to the UCF Library.

In one example, the method 1000 further comprises presenting the content item on a display, wherein the presenting is performed without waiting for a result of the reclassifying.

In one example, the method 1000 further comprises throttling the reclassifying based on a load of the system.

In one example, reclassifying the content item further includes: checking for duplicate requests to reclassify the content item; and dropping the duplicate requests to reclassify the content item.

During some experiments, old content on the social network was reclassified and it was observed that there were some periods of time with a higher frequency of content that was approved but should have not been approved. This could be because some forms of spam were ahead of the classifiers and these forms of spam were not identified until later in time as the classifiers improved.

A statistical analysis was also performed, and the analysis showed that about 79% of members do not generate low-quality content and that about 13% of members created more than 90% of the low-quality content.

It is noted that these results are for illustration purposes and not necessarily representative of the ultimate performance of a well-tuned system. The results should therefore not be interpreted to be exclusive or limiting, but rather illustrative.

Figure 11:
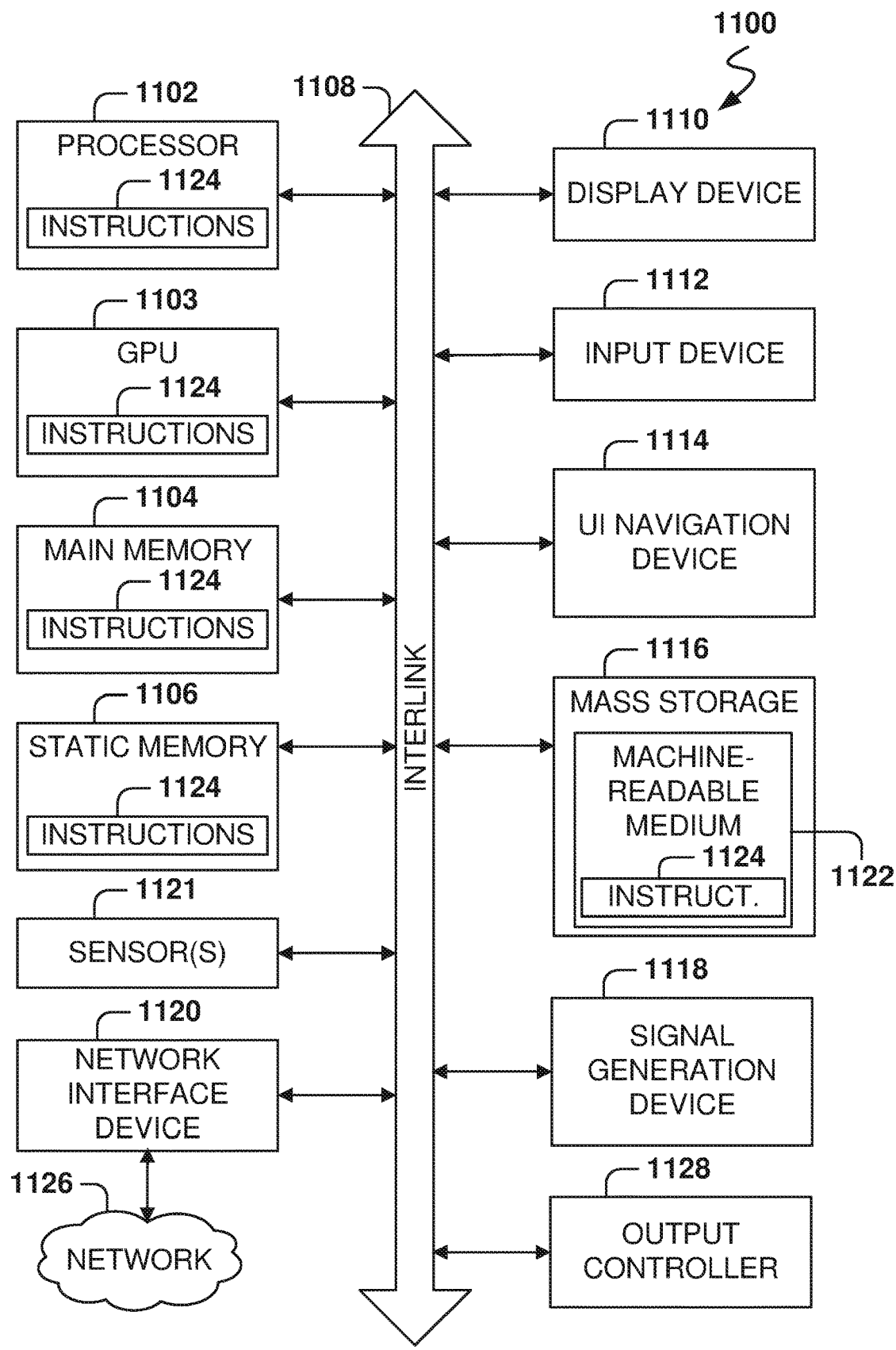
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   classifying, by a software classifier, a content item to be presented on displays of client devices that communicate with an online service, as one of a plurality of classifications that includes (1) a low-quality classification that indicates that the content item is not allowed to be presented on the online service and (2) an approved classification that indicates that the content item is allowed to be presented on the online service;
   storing, in a content database of the online service, the content item with a content certification record (CCR), the CCR including (a) a result of the classifying of the content item and (b) a content classification platform signature (CCPS) that includes a classifier identifier of the software classifier and a classifier version identifier of the software classifier;
   after storing the content item with the CCR, comparing the classifier version identifier in the CCR to a latest classifier version identifier of the software classifier; and
   reclassifying the content item with the latest version of the software classifier in response to determining that the latest classifier version identifier of the software classifier is different than the classifier version identifier in the CCR;
   wherein the method is performed by one or more computing devices.

2. The method as recited in claim 1, wherein classifying the content item further includes:
   analyzing the content item by a plurality of classifiers, each classifier determining if the content item is approved for presentation on the online service or is not approved for presentation on the online service;
   determining that the content item is not approved for presentation if any classifier in the plurality of classifiers determines that the content item is not approved for presentation; and
   determining that the content item is approved if each classifier in the plurality of classifiers determines that the content item is approved for presentation.

3. The method as recited in claim 1, further comprising:
   detecting a trigger for determining whether to reclassify the content item;
   wherein the trigger is selected from a group consisting of:
   the content item being viewed on the online service,
   an expiration of a timer of a classifier,
   the content item being edited, or
   an on-demand classification request.

4. The method as recited in claim 1, wherein the software classifier is part of a content classification platform (CCP), wherein the online service includes a plurality of domains that generate content items, the method further comprising:
   providing a unified content filtering library (UCF library) at each domain, the UCF library interfacing with the CCP for classifying content items.

5. The method as recited in claim 4, wherein the CCR is stored within the domain associated with the content item.

6. The method as recited in claim 4, further comprising:
   periodically sending the latest CCPS from the CCP to the UCF Library.

7. The method as recited in claim 1, further comprising:
   presenting the content item on a display, wherein the presenting is performed without waiting for a result of the reclassifying.

8. The method as recited in claim 1, further comprising:
   throttling the reclassifying based on a load of a content classification platform.

9. The method as recited in claim 1, wherein reclassifying the content item further includes:
   checking for duplicate requests to reclassify the content item; and
   dropping the duplicate requests to reclassify the content item.

10. The method of claim 1, wherein the CCR also includes a content signature of the content item, the method further comprising:
    after storing the content item with the CCR, comparing the content signature in the CCR to a current content signature of the content item;
    reclassifying the content item in response to determining that the current content signature is different than the content signature in the CCR.

11. A system comprising:
    one or more hardware processors;
    a plurality of domains, each domain generating content for presentation in an online service; and
    a content classification platform (CCP) that classifies the content generated by the plurality of domains, the CCP comprising a content classification platform signature (CCPS) that includes a classifier identifier of a software classifier and a classifier version identifier of the software classifier, the CCP generating a result of classifying a content item from a first domain of the plurality of domains;
    wherein the first domain stores, in a database of the first domain, the content item with a content certification record (CCR), the CCR including the result for classifying the content item and the CCPS;

wherein, after the first domain stores the content item with the CCR, the first domain compares the classifier version identifier in the CCR to a latest classifier version identifier;

wherein the CCP reclassifies, in response to the first domain determining that the latest classifier version identifier is different than the classifier version identifier in the CCR, the content item upon request from the first domain.

12. The system as recited in claim 11, wherein classifying the content item further includes:

analyzing the content item by a plurality of classifiers, each classifier determining if the content item is approved for presentation on the online service or is not approved for presentation on the online service;

determining that the content item is not approved for presentation if any classifier in the plurality of classifiers determines that the content item is not approved for presentation; and determining that the content item is approved if each classifier in the plurality of classifiers determines that the content item is approved for presentation.

13. The system as recited in claim 11, wherein the first domain detects a trigger for determining whether to reclassify the content item, wherein the trigger is selected from a group consisting of:

the content item being viewed on the online service,
an expiration of a timer of a classifier,
the content item being edited, or
an on-demand classification request.

14. The system as recited in claim 11, wherein the first domain causes presentation of the content item on a display, wherein the presentation is performed without waiting for a result of the reclassifying.

15. The system as recited in claim 11, wherein the first domain causes presentation of the content item on a display after obtaining a result of the reclassifying.

16. The system of claim 11, wherein:

the CCR also includes a content signature of the content item;

after the first domain stores the content item with the CCR, the first domain compares the content signature in the CCR to a current content signature of the content item;

wherein the CCP reclassifies, in response to the first domain determining that the current content signature is different than the content signature in the CCR, the content item.

17. A non-transitory machine-readable storage medium including instructions that, when executed by one or more processors, cause:

classifying, by a software classifier, a content item, to be presented on displays of client devices that communicate with an online service, as one of a plurality of classifications that includes (1) a low-quality classification that indicates that the content item is not allowed to be presented on the online service and (2) an approved classification that indicates that the content item is allowed to be presented on the online service;

storing, in a content database of the online service, the content item with a content certification record (CCR), the CCR including (a) a result of the classifying of the content item and a content signature;

after storing the content item with the CCR, comparing the content signature in the CCR to a current content signature of the content item; and reclassifying the content item with a latest version of the software classifier in response to determining that the content signature in the CCR is different than the current content signature of the content item.

18. The non-transitory machine-readable storage medium as recited in claim 17, wherein classifying the content item further includes:

analyzing the content item by a plurality of classifiers, each classifier determining if the content item is approved for presentation on the online service or is not approved for presentation on the online service;

determining that the content item is not approved for presentation if any classifier in the plurality of classifiers determines that the content item is not approved for presentation; and determining that the content item is approved for presentation if each of plurality of classifiers determines that the content item is approved for presentation.

19. The non-transitory machine-readable storage medium as recited in claim 17, wherein the instructions, when executed by the one or more processors, further cause:

detecting a trigger for determining whether to reclassify the content item, wherein the trigger is selected from a group consisting of:
the content item being viewed on the online service,
an expiration of a timer of a classifier,
the content item being edited, or
an on-demand classification request.

20. The non-transitory machine-readable storage medium as recited in claim 17, wherein the instructions, when executed by the one or more processors, further cause:

presenting the content item on a display, wherein the presenting is performed without waiting for a result of the reclassifying.

21. The non-transitory machine-readable storage medium as recited in claim 17, wherein the instructions, when executed by the one or more processors, further cause:

presenting the content item on a display only after obtaining a result of the reclassifying.

22. The non-transitory machine-readable storage medium as recited in claim 17, wherein the CCR also includes content classification platform signature (CCPS) that includes a classifier identifier of the software classifier and a classifier version identifier of the software classifier, wherein the instructions when executed by the one or more processors, further cause;

after storing the content item with the CCR, comparing the classifier version identifier in the CCR to a latest classifier version identifier of the software classifier; and reclassifying the content item in response to determining that the latest classifier version identifier of the software classifier is different than the classifier version identifier in the CCR.

* * * * *